US010006170B2

(12) United States Patent
Grimm et al.

(10) Patent No.: US 10,006,170 B2
(45) Date of Patent: Jun. 26, 2018

(54) ALDEHYDE-FUNCTIONALIZED POLYMERS FOR PAPER STRENGTH AND DEWATERING

(71) Applicant: Ecolab USA Inc., St. Paul, MN (US)

(72) Inventors: Herman Mark Grimm, Stanley, NC (US); Mei Liu, Plainfield, IL (US); Robert M. Lowe, Chicago, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days. days.

(21) Appl. No.: 15/229,681

(22) Filed: Aug. 5, 2016

(65) Prior Publication Data

US 2017/0037574 A1 Feb. 9, 2017

Related U.S. Application Data

(60) Provisional application No. 62/201,877, filed on Aug. 6, 2015.

(51) Int. Cl.
*D21H 21/18* (2006.01)
*D21H 17/37* (2006.01)
*D21H 17/55* (2006.01)
*D21H 21/06* (2006.01)
*D21H 21/10* (2006.01)
*D21H 21/20* (2006.01)
*C08F 220/56* (2006.01)

(52) U.S. Cl.
CPC ......... *D21H 17/375* (2013.01); *C08F 220/56* (2013.01); *D21H 17/55* (2013.01); *D21H 21/06* (2013.01); *D21H 21/10* (2013.01); *D21H 21/18* (2013.01); *D21H 21/20* (2013.01); *C08F 2500/02* (2013.01); *C08F 2800/10* (2013.01); *C08F 2810/40* (2013.01)

(58) Field of Classification Search
CPC ............... C08F 220/56; C08F 2500/02; C08F 2800/10; C08F 2800/40; D21H 21/18; D21H 17/375; D21H 17/55; D21H 17/06; D21H 21/06; D21H 21/10; D21H 21/20
USPC .......................... 162/164.6, 158, 166, 168.3
See application file for complete search history.

(56) References Cited

U.S. PATENT DOCUMENTS

| | | |
|---|---|---|
| 2,982,749 A | 5/1961 | Friedrich et al. |
| 3,284,393 A | 11/1966 | Vanderhoff et al. |
| 3,556,932 A | 1/1971 | Coscia et al. |
| 3,734,873 A | 5/1973 | Anderson et al. |
| 4,533,434 A | 8/1985 | Yoshioka et al. |
| 4,603,176 A | 7/1986 | Bjorkquist et al. |
| 4,605,702 A | 8/1986 | Guerro et al. |
| 4,919,821 A | 4/1990 | Fong et al. |
| 4,929,655 A | 5/1990 | Takeda et al. |
| 5,006,590 A | 4/1991 | Takeda et al. |
| 5,571,380 A | 11/1996 | Fallon |
| 5,597,858 A | 1/1997 | Ramesh et al. |
| 5,597,859 A | 1/1997 | Hurlock et al. |
| 5,605,970 A | 2/1997 | Selvarajan |
| 5,654,198 A | 8/1997 | Carrier et al. |
| 5,674,362 A | 10/1997 | Underwood et al. |
| 5,837,776 A | 11/1998 | Selvarajan et al. |
| 5,985,992 A | 11/1999 | Chen |
| 6,013,708 A | 1/2000 | Mallon et al. |
| 6,077,394 A | 6/2000 | Spence et al. |
| 6,083,348 A | 7/2000 | Auhorn et al. |
| 6,315,866 B1 | 11/2001 | Sanchez |
| 6,348,132 B1 | 2/2002 | Zhang et al. |
| 6,426,383 B1 | 7/2002 | Fong et al. |
| 6,472,487 B2 | 10/2002 | Schroeder et al. |
| 6,610,209 B1 | 8/2003 | Sommese et al. |
| 6,787,574 B1 | 9/2004 | Farley et al. |
| 7,455,751 B2 | 11/2008 | Ward et al. |
| 7,641,766 B2 | 1/2010 | St. John et al. |
| 7,901,543 B2 | 3/2011 | St. John et al. |
| 8,709,207 B2 | 4/2014 | Grimm et al. |
| RE44,936 E | 6/2014 | St. John et al. |
| 8,852,400 B2 | 10/2014 | St. John et al. |
| 8,894,817 B1 | 11/2014 | Cheng et al. |
| RE45,383 E | 2/2015 | St. John et al. |
| 2002/0134521 A1 | 9/2002 | Shannon et al. |
| 2005/0161181 A1 | 7/2005 | St. John et al. |
| 2010/0089542 A1 | 4/2010 | St. John et al. |
| 2015/0197893 A1 | 7/2015 | Cheng et al. |

FOREIGN PATENT DOCUMENTS

| | | |
|---|---|---|
| EP | 0183466 B1 | 6/1986 |
| EP | 0657478 A2 | 6/1995 |
| EP | 0657478 A3 | 6/1995 |
| EP | 0183466 B2 | 8/1997 |
| EP | 0630909 B1 | 10/1998 |

OTHER PUBLICATIONS

European Patent Office, International Search Report in International Patent Application No. PCT/US2016/045782, dated Oct. 26, 2016, 3 pp.
European Patent Office, Written Opinion in International Patent Application No. PCT/US2016/045782, dated Oct. 26, 2016, 6 pp.
Hunkeler et al., "Mechanism, kinetics and modelling of the inverse-microsuspension homopolymerization of acrylamide," *Polymer*, 30(1), pp. 127-142 (Jan. 1989).
Hunkeler et al., "Mechanism, kinetics and modelling of inverse-microsuspension polymerization: 2. Copolymerization of acrylamide with quaternary ammonium cationic monomers," *Polymer*, 32(14), pp. 2626-2640 (1991).

*Primary Examiner* — Mark Halpern
(74) *Attorney, Agent, or Firm* — Leydig, Voit & Mayer, Ltd.

(57) ABSTRACT

Disclosed are compositions and methods useful in applications relating to papermaking. The compositions and methods of the present invention comprise aldehyde-functionalized polymers designed to impart high paper strength and enhance water removal during the papermaking process. The aldehyde-functionalized polymers are of relatively low molecular weight, and comprise amino and/or amide groups mono-reacted and di-reacted at a ratio of at least about 1.5 to 1. The low molecular weight polymers of the present invention have the same strength and dewatering performance as corresponding high molecular weight polymers.

20 Claims, 7 Drawing Sheets

ALDEHYDE-FUNCTIONALIZED POLYMERS FOR PAPER STRENGTH AND DEWATERING

CROSS-REFERENCE TO RELATED APPLICATION

This patent application claims the benefit of U.S. Provisional Patent Application No. 62/201,877, filed Aug. 6, 2015, which is incorporated by reference in its entirety.

FIELD OF INVENTION

The invention relates to compositions comprising aldehyde-functionalized polymers and methods of using the compositions for papermaking.

BACKGROUND OF THE INVENTION

The ability to form paper of superior strength at minimal cost is important to the manufacture of paper products. Paper strength is dependent upon a number of factors, including choice of fibers, refining methods, press loading, and chemical additives employed, and can be altered by adjusting these variables. Trends in the industry including increased use of lower quality fiber sources and increased closure of mills' water systems has generated a greater need for the development of exemplary and cost-effective strengthening processes. For example, the use of inexpensive low-quality fibers may necessitate strategies such as increased refining, greater press loads, or chemical additives. Unfortunately, greater refining often leads to undesirable paper properties such as increased paper density, reduced tear, and decreased porosity, as well as slower production times. Increasing press loads have mechanical limitations such as sheet crushing, and can also lead to inefficient paper production. Thus, chemical additives are commonly added to the papermaking process to enhance the properties of paper, and can be utilized to increase the compressive strength, bursting strength, and tensile breaking strength of the paper product.

The papermaking process involves taking a slurry of papermaking raw materials at a consistency (weight percent solids) in the range of 0.1 to 1.5 weight percent and dewatering it to form a sheet with a final consistency of about 95 weight percent. The rate of paper production or, equivalently, the machine speed is dictated by the rate at which the water can be removed, and consequently, any chemical treatment which can increase the rate of water removal has value for the papermaker. An ideal chemical additive for papermaking would impart superior paper strength, promote good dewatering (e.g., press dewatering), and would be less costly than alternative strategies.

A variety of polymeric additives act as strengthening agents, and can be used to obtain high-strength paper products, including natural polymers (e.g., starch, cellulose gum) and synthetic resins (e.g., polyacrylic esters, polyacrylamides, glyoxalated polyacrylamides). Strengthening agents are believed to increase the strength of paper by forming covalent bonds with the cellulosic material in paper. Optimal strengthening agents form strong bonds to cellulose fibers, and impart increased strength per unit of bonded area of the paper. Synthetic resins offer unique benefits, such as ease of use and structural versatility.

Polyacrylamides are well-known synthetic resins used to generate dry strength as well as aide in press dewatering, and often comprise a small amount of cationic monomer incorporated into the backbone of the polymer to increase association of the polymer with the anionically charged cellulose fibers. In particular, glyoxalated polyacrylamides (i.e., GPAMs) are a class of modified polyacrylamides that are generally formed from glyoxalation of a polyacrylamide, and are well-known to deliver enhanced paper strength as well as press dewatering efficiency.

The properties of glyoxalated polyacrylamides depend on the monomers and the percent content of mono-reacted amide and di-reacted amide present in the modified polymer. The mono-reacted and di-reacted amide species each have distinct reactivities. The amount of mono-reacted amide and di-reacted amide indicates the amount of free aldehyde available in the polymer for bonding, and is highly dependent on the conditions of the aldehyde-functionalization reaction (e.g., temperature, reactant/reagent ratios). The amount of mono-reacted and di-reacted amide present in the aldehyde-functionalized polymer is often represented as a ratio between the two species.

The conventional wisdom in the papermaking field is that polymeric additives (e.g., GPAMs) provide paper of higher dry strength when the molecular weight of the polymer is relatively high, e.g., in the range of hundreds of thousands to a few million g/mole. It is generally believed that paper strength deteriorates when the molecular weight is too low, and thus, many polymeric additives of high molecular weight have been developed in the industry. However, high molecular weight polymers can be more difficult to manipulate due to viscosity, solids, and stability requirements. High molecular weight polymers can also be more cost prohibitive to use than the corresponding low weight polymers.

A more economical and simple chemical composition and method for enhancing the strength and dewatering properties of the papermaking process would be a valuable contribution to the field.

BRIEF SUMMARY OF THE INVENTION

In an embodiment, the invention provides a composition for treating the strength and press section dewatering of a paper sheet. The composition comprises one or more aldehyde-functionalized polymers comprising amino groups, amide groups, or a combination of amino and amide groups thereof, wherein (i) at least about 15 mole percent of the amino groups, amide groups, or both the amino and amide groups are functionalized with one or more aldehydes, (ii) the amino groups, amide groups, or both the amino and amide groups are mono-reacted and di-reacted at a ratio of at least about 1.5 to 1, and (iii) the aldehyde-functionalized polymers have an average molecular weight of from about 10,000 g/mole to about 300,000 g/mole.

In another embodiment, the invention provides a method for enhancing the strength and press section dewatering of a paper sheet on a paper machine. The method comprises adding to the paper sheet about 0.05 lb/ton to about 20 lb/ton, based on dry fiber, of a composition comprising one or more aldehyde-functionalized polymers comprising amino groups, amide groups, or a combination of amino and amide groups thereof, wherein (i) at least about 15 mole percent of the amino groups, amide groups, or both the amino or amide groups are functionalized with one or more aldehydes, (ii) the amino groups, amide groups, or both the amino or amide groups are mono-reacted and di-reacted at a ratio of at least about 1.5 to 1, and (iii) the aldehyde-functionalized polymers have an average molecular weight of from about 10,000 g/mole to about 300,000 g/mole.

DETAILED DESCRIPTION OF THE INVENTION

Figure 1:
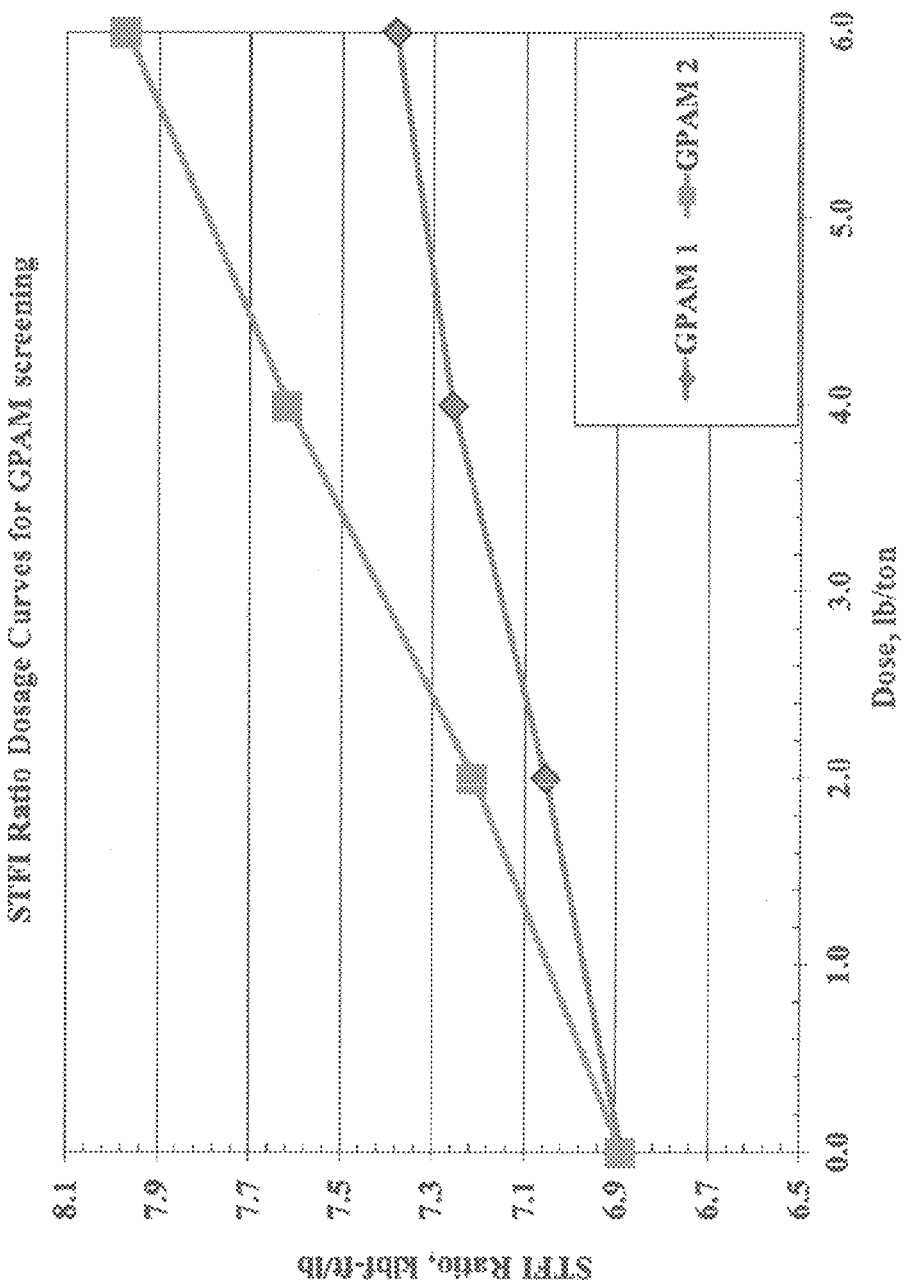
FIG. 1 is a line graph that illustrates the STFI ratio of paper per dosage of an inventive low molecular weight acrylamide/DADMAC copolymer (GPAM 1) and a high molecular weight acrylamide/DADMAC copolymer (GPAM 2) in a laboratory experiment.

The following definitions are provided to determine how terms used in this application, and in particular, how the claims are to be construed. The organization of the definitions is for convenience only and is not intended to limit any of the definitions to any particular category.

"Acrylamide monomer" means a monomer of formula

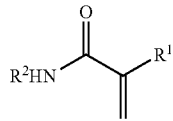

wherein $R^1$ is selected from the group consisting of H, $C_1$-$C_{16}$ alkyl, aryl, arylalkyl, $C_2$-$C_{16}$ alkenyl, $C_2$-$C_{16}$ alkynyl, heteroaryl, alkylheteroaryl, $C_3$-$C_8$ cycloalkyl, and halogen; and $R^2$ is selected from the group consisting of hydrogen, $C_1$-$C_{16}$ alkyl, aryl, arylalkyl, $C_2$-$C_{16}$ alkenyl, $C_2$-$C_{16}$ alkynyl, heteroaryl, alkylheteroaryl, and hydroxyl.

"Aldehyde" means a compound containing one or more aldehyde (—CHO) groups, where the aldehyde groups are capable of reacting with the amino or amide groups of a polymer comprising amino or amide groups as described herein. Representative aldehydes include formaldehyde, paraformaldehyde, glutaraldehyde, glyoxal, and the like.

"Aldehyde-functionalized polymer" refers to a polymer that results from a reaction between a polymer comprising at least one amide group or amino group with an aldehyde.

"Alkenyl" refers to a straight or branched hydrocarbon, preferably having 2, 3, 4, 5, 6, 7, 8, 9, 10, 11, 12, 13, 14, 15, or 16 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents.

"Alkyl" refers to a straight-chain or branched alkyl substituent. Examples of such substituents include methyl, ethyl, propyl, isopropyl, n-butyl, sec-butyl, isobutyl, tert-butyl, pentyl, isoamyl, hexyl, and the like.

"Alkylheteroaryl" refers to an alkyl group linked to a heteroaryl group.

"Alkynyl" refers to a straight or branched hydrocarbon, preferably having 2, 3, 4, 5, 6, 7, 8, 9, 10, 11, 12, 13, 14, 15, or 16 carbons, and having one or more carbon-carbon triple bonds. Alkynyl groups include, but are not limited to, ethynyl, propynyl, and butynyl. Alkynyl groups may be unsubstituted or substituted by one or more suitable substituents.

"Amide group" means a group of formula —C(O)NHY$_1$ where Y$_1$ is selected from the group consisting of hydrogen, $C_1$-$C_{16}$ alkyl, aryl, arylalkyl, $C_2$-$C_{16}$ alkenyl, $C_2$-$C_{16}$ alkynyl, heteroaryl, alkylheteroaryl, or hydroxyl.

"Amino group" means a group of formula —NH(Y)$_2$ where each of Y$_2$ can be the same or different and each of Y is selected from the group consisting of hydrogen, $C_1$-$C_{16}$ alkyl, aryl, arylalkyl, $C_2$-$C_{16}$ alkenyl, $C_2$-$C_{16}$ alkynyl, heteroaryl, alkylheteroaryl, or hydroxyl.

"Amphoteric polymer" refers to a polymer derived from both cationic monomers and anionic monomers, and, possibly, other nonionic monomer(s). Representative amphoteric polymers include copolymers composed of terpolymers composed of acrylic acid, DADMAC and acrylamide, and the like.

"Aryl" refers to an unsubstituted or substituted aromatic carbocyclic substituent, as commonly understood in the art, and the term "$C_6$-$C_{10}$ aryl" includes phenyl and naphthyl. It is understood that the term aryl applies to cyclic substituents that are planar and comprise 4n+2n electrons, according to Hückel's Rule.

"Arylalkyl" means an aryl-alkylene group where aryl and alkylene are defined herein. Representative arylalkyl groups include benzyl, phenylethyl, phenylpropyl, 1-naphthylmethyl, and the like.

"Chain transfer agent" means any molecule, used in free-radical polymerization, which will react with a polymer radical to form a dead polymer and a new radical. In particular, adding a chain transfer agent to a polymerizing mixture results in a chain-breaking and a concomitant decrease in the size of the polymerizing chain. Thus, adding a chain transfer agent limits the molecular weight of the polymer being prepared.

"Consisting essentially of" means that the methods and compositions may include additional steps, components, ingredients or the like, but only if the additional steps, components and/or ingredients do not materially alter the basic and novel characteristics of the claimed methods and compositions.

"Cross-linking agent" or "branching agent" means a multifunctional monomer that when added to polymerizing monomer or monomers results in "branched" polymers or "cross-linked" polymers in which a branch or branches from one polymer molecule becomes attached to other polymer molecules.

"DADMAC" refers to monomeric units of a diallyldimethylammonium halide.

"Halogen" or "halo" refers to a moiety selected from the group consisting of fluorine, chlorine, bromine, and iodine.

"Monomer" means a polymerizable allylic, vinylic, or acrylic compound. The monomer may be anionic, cationic, nonionic, or zwitterionic.

"STFI" means Short Span Compression Test, a method of measuring paper's resistance to compressive forces, it is defined in TAPPI Method T826 as well as the article "The comparative response of Ring Crush Test and STFI Short Span Crush Test to paper mill process variable changes" by Joseph J. Batelka, Corrugating International (October 2000).

"Structural modifier" means an agent that is added to the aqueous polymer solution to control the polymer structure and solubility characteristics. The structural modifier is selected from the group consisting of cross-linking agents and chain transfer agents.

"Zwitterionic monomer" means a polymerizable molecule containing cationic and anionic (charged) functionality in equal proportions, so that the molecule is net neutral overall.

The invention provides compositions comprising low molecular weight aldehyde-functionalized polymers and methods for using the compositions to enhance the strength and dewatering properties of a paper sheet. Applicants have surprisingly and unexpectedly discovered that compositions comprising an aldehyde-functionalized polymer of relatively low molecular weight can impart strength and dewatering properties to paper comparable to a corresponding high molecular weight aldehyde-functionalized polymer. Since the press loading dynamics cannot be simulated in a laboratory, the effect is most pronounced when the paper is produced in a paper mill. This result is in contrast to the common belief that a low molecular weight aldehyde-functionalized polymer of the same composition yields paper of lower dry strength. Representative examples of aldehyde-functionalized polymers of higher molecular weight can be found in U.S. Pat. No. 7,641,766 and U.S. Pat. No. 7,901,543.

The aldehyde-functionalized polymers of the present invention comprise amino groups, amide groups, or both amino and amide groups substituted with an aldehyde in a mono-reacted to di-reacted amide ratio of at least about 1.5 to 1. Without wishing to be bound by any particular theory, it is believed that the mono-reacted aldehyde in the polymer is responsible for the observed enhancement of paper strength in the presence of the aldehyde-functionalized polymer. Thus, it is believed that the mono-reacted species (e.g., species having a free aldehyde) is responsible for the observed paper strength because, unlike the di-reacted species, the mono-reacted species can form a covalent bond with cellulose fiber. Therefore, it is postulated that a composition comprising an aldehyde-functionalized polymer having a greater mono- to di-reacted ratio imparts increased strength to paper when added to a papermaking process when compared to previously disclosed polymers. A high ratio of mono-reacted to di-reacted amide species can be used to indirectly gage the amount of free aldehyde in the aldehyde-functionalized polymer.

Mono-reacted amide or amine refers to a polymer formed when one glyoxal reacts with one amide or amine, and di-reacted amide or amine refers to a polymer formed when one glyoxal reacts with two amides or amines.

In an embodiment, the invention provides a composition for treating the strength and press section dewatering of a paper sheet. The composition comprises one or more aldehyde-functionalized polymers comprising amino groups, amide groups, or a combination of amino and amide groups thereof, wherein (i) at least about 15 mole percent of the amino groups, amide groups, or both the amino and amide groups are functionalized with one or more aldehydes, (ii) the amino groups, amide groups, or both the amino and amide groups are mono-reacted and di-reacted at a ratio of at least about 1.5 to 1, and (iii) the aldehyde-functionalized polymers have an average molecular weight of from about 10,000 g/mole to about 300,000 g/mole.

The aldehyde-functionalized polymer is formed by reacting the polymer with one or more aldehydes. In certain embodiments, the aldehyde-functionalized polymer comprises amino groups, amide groups, or a combination of amino and amide groups that are mono-reacted and di-reacted with aldehyde at a ratio of at least about 1.5 to 1. In certain embodiments, the aldehyde-functionalized polymer comprises amino groups, amide groups, or a combination of amino and amide groups that are mono-reacted and di-reacted with aldehyde at a ratio of at least about 3 to 1. Thus, in certain embodiments, the aldehyde-functionalized polymer comprises amino groups, amide groups, or both amino and amide groups that are mono-reacted and di-reacted with aldehyde at a ratio of at least about 3 to 1, at least about 3.5 to 1, at least about 4 to 1, at least about 4.5 to 1, at least about 5 to 1, at least about 5.5 to 1, or at least about 6 to 1. In certain embodiments, the aldehyde-functionalized polymer comprises amino groups, amide groups, or a combination of amino and amide groups that are mono-reacted and di-reacted with aldehyde at a ratio of greater than about 3 to 1. In certain embodiments, the aldehyde-functionalized polymer comprises amino groups, amide groups, or a combination of amino and amide groups that are mono-reacted and di-reacted with aldehyde at a ratio of at least about 3.5 to 1. In certain embodiments, the aldehyde-functionalized polymer comprises amino groups, amide groups, or a combination of amino and amide groups that are mono-reacted and di-reacted with aldehyde at a ratio of at least about 4 to 1.

In certain embodiments, the aldehyde-functionalized polymer comprises amino groups, amide groups, or a combination of amino and amide groups that are mono-reacted and di-reacted with aldehyde at a ratio of from about 3:1 to about 20:1. Thus, in certain embodiments, the aldehyde-functionalized polymer comprises amino groups, amide groups, or a combination of amino and amide groups that are mono-reacted and di-reacted with aldehyde at a ratio of from about 3:1 to about 20:1, from about 3.5:1 to about 20:1, from about 4:1 to about 20:1, from about 4.5:1 to about 20:1, from about 5:1 to about 20:1, from about 5.5:1 to about 20:1, or from about 6:1 to about 20:1.

In certain embodiments, the composition comprises mono-reacted aldehyde and di-reacted aldehyde at a ratio of at least about 7 to 1, at least about 8 to 1, at least about 9 to 1, at least about 10 to 1, at least about 11 to 1, or at least about 12 to 1. In certain embodiments, the composition comprises mono-reacted aldehyde and di-reacted aldehyde at a ratio of from about 9:1 to about 50:1.

The aldehyde-functionalized polymer can comprise any amount of amino groups, amide groups, and combinations that are mono-reacted. In certain embodiments, at least about 10 mole percent of the amino groups, amide groups, and combinations thereof are mono-reacted with at least one aldehyde. In certain embodiments, at least about 15 mole percent of the amino groups, amide groups, and combinations thereof are mono-reacted with at least one aldehyde. In certain embodiments, at least about 20 mole percent of the amino groups, amide groups, and combinations thereof are mono-reacted with at least one aldehyde.

In certain embodiments, the aldehyde-functionalized polymer is formed by functionalizing a polymer comprising amino groups, amide groups, or a combination of amino and amide groups with one or more aldehydes wherein the aldehyde reacts with at least about 15 mole percent of the amino groups, amide groups, or combinations thereof. Thus, in certain embodiments, the aldehyde-functionalized polymer is formed by reacting a polymer comprising amino and/or amide groups with one or more aldehydes wherein the aldehyde reacts with at least about 15 mole percent of the amino and/or amide groups, at least about 16 mole percent of the amino and/or amide groups, at least about 17 mole percent of the amino and/or amide groups, at least about 18 mole percent of the amino and/or amide groups, at least about 19 mole percent of the amino and/or amide groups, at least about 20 mole percent of the amino and/or amide groups, at least about 22 mole percent of the amino and/or amide groups, at least about 24 mole percent of the amino and/or amide groups, at least about 25 mole percent of the amino and/or amide groups, at least about 30 mole percent of the amino and/or amide groups, at least about 35 mole percent of the amino and/or amide groups, at least about 40 mole percent of the amino and/or amide groups, at least about 45 mole percent of the amino and/or amide groups, or at least about 50 mole percent of the amino and/or amide groups.

In certain embodiments, the aldehyde-functionalized polymer has an average molecular weight of from about 10,000 g/mole to about 300,000 g/mole. Thus, in certain embodiments, the aldehyde-functionalized polymer has an average molecular weight of from about 10,000 g/mole to about 300,000 g/mole, from about 10,000 g/mole to about 250,000 g/mole, from about 10,000 g/mole to about 200,000 g/mole, from about 10,000 g/mole to about 150,000 g/mole, from about 10,000 g/mole to about 125,000 g/mole, from about 10,000 g/mole to about 100,000 g/mole, from about 10,000 g/mole to about 50,000 g/mole, from about 10,000 g/mole to about 40,000 g/mole, from about 10,000 g/mole to about 30,000 g/mole, from about 10,000 g/mole to about 20,000 g/mole, from about 20,000 g/mole to about 300,000 g/mole, from about 50,000 g/mole to about 300,000 g/mole, from about 100,000 g/mole to about 300,000 g/mole, from about 50,000 g/mole to about 200,000 g/mole, from about 50,000 g/mole to about 150,000 g/mole, or from about 50,000 g/mole to about 100,000 g/mole. In certain embodiments, the aldehyde-functionalized polymer has an average molecular weight of from about 10,000 g/mole to about 200,000 g/mole.

In certain embodiments, the aldehyde-functionalized polymer has an average molecular weight of from about 10,000 g/mole to less than about 100,000 g/mole. In certain embodiments, the aldehyde-functionalized polymer has an average molecular weight of less than about 100,000 g/mole.

The aldehyde-functionalized polymer can be prepared by any suitable synthetic chemical method. One preparation involves reacting a polymer comprising amino groups, amide groups, or amino and amide groups with an aldehyde at a pH of from about 7 to about 9. An aqueous solution of the polymer comprising amino groups, amide groups, or amino and amide groups at a pH of about 9 is charged with aldehyde at about 25° C. The pH of the solution is adjusted to a range of from about 7.5 to about 8.5 using base, and maintained within that range. In certain embodiments, the base is aqueous sodium hydroxide. The rate of viscosity increase is monitored during the reaction using a viscometer.

Once the desired viscosity has been reached (about 5 cps to about 6 cps), the pH of the reaction mixture is adjusted to from about 2 to about 3.5 using acid. In certain embodiments, the acid used is sulfuric acid. The rate of reaction depends on the temperature, total concentration of polymer and aldehyde, the ratio of aldehyde to amide/amino functional groups, and pH. Higher reaction rates are expected when the temperature, total concentration of polymer and aldehyde, the ratio of aldehyde to amide/amino functional groups, or pH is increased. For example, a higher pH yields a faster increase in viscosity. Therefore, the rate of viscosity can be controlled by increasing or decreasing the pH of the reaction mixture.

The aldehyde used to form the aldehyde-functionalized polymer can be any suitable aldehyde. In certain embodiments, the aldehyde used to form the aldehyde-functionalized polymer is selected from formaldehyde, paraformaldehyde, glutaraldehyde, glyoxal, combinations thereof, and the like. In certain embodiments, the aldehyde used to form the aldehyde-functionalized polymer is glyoxal. In certain embodiments, the aldehyde-functionalized polymer is formed by reacting a polymer comprising an amino group, amide group, or amino and amide groups with one aldehyde. In certain embodiments, the aldehyde-functionalized polymer comprising an amino group, amide group, or amino and amide groups is formed by reacting a polymer with two different aldehydes. In certain embodiments, the aldehyde-functionalized polymer comprising an amino group, amide group, or amino and amide groups is formed by reacting a polymer with three or more different aldehydes.

The polymer comprising amino and/or amide groups can be prepared by any suitable polymerization method. In certain embodiments, the polymer comprising amino and/or amide groups is synthesized using water-in-oil polymerization (i.e., emulsion), dispersion polymerization, gel polymerization, or solution polymerization methods. In certain embodiments, polyamines and polyamides are prepared by copolymerizing monomers under free radical forming conditions using any of the aforementioned techniques. Polyamines may also be prepared by modification of a pre-formed polyamide, for example by hydrolysis of acrylamide-vinylformamide copolymer using acid or base as described in U.S. Pat. Nos. 6,610,209 and 6,426,383. Polyaminoamides may also be prepared by direct amidation of polyalkyl carboxylic acids and transamidation of copolymers containing carboxylic acid and (meth)acrylamide units as described in U.S. Pat. No. 4,919,821.

In certain embodiments, the polymerization and/or post polymerization reaction conditions are selected such that the resulting polymer comprising amino and/or amide groups has a molecular weight of from about 1,000 g/mole to about 10,000,000 g/mole. Thus, in certain embodiments, the resulting polymer comprising amino and/or amide groups has a molecular weight of from about 1,000 g/mole to about 10,000,000 g/mole, from about 1,000 g/mole to about 1,000,000 g/mole, from about 1,000 g/mole to about 100,000 g/mole, from about 1,000 g/mole to about 10,000 g/mole, from about 2,000 g/mole to about 1,000,000 g/mole, from about 2,000 g/mole to about 100,000 g/mole, from about 2,000 g/mole to about 10,000 g/mole, from about 10,000 g/mole to about 10,000,000 g/mole, from about 10,000 g/mole to about 1,000,000 g/mole, or from about 10,000 g/mole to about 100,000 g/mole.

The monomer or monomers used to form the polymer comprising amino groups, amide groups, or amino and amide groups may be nonionic, anionic, or cationic. The polymer comprising amino groups, amide groups, or amino and amide groups can be a copolymer, terpolymer, quaterpolymer, and so on.

Representative non-ionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-tert-butylacrylamide, N-methylolacrylamide, diallylamine, allylamine, and the like.

Representative anionic monomers include acrylic acid, and its salts, including, but not limited to sodium acrylate, and ammonium acrylate, methacrylic acid, and its salts, including, but not limited to sodium methacrylate, and ammonium methacrylate, 2-acrylamido-2-methylpropanesulfonic acid, the sodium salt of AMPS, sodium vinyl sulfonate, styrene sulfonate, maleic acid, and its salts, including, but not limited to the sodium salt, and ammonium salt, sulfonate itaconate, sulfopropyl acrylate or methacrylate or other water-soluble forms of these or other polymerizable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminoethyl acrylate methyl chloride quaternary salt, dimethylaminoethyl acrylate benzyl chloride quaternary salt, dimethylaminoethyl methacrylate methyl chloride quaternary salt, dimethylaminoethyl methacrylate benzyl chloride quaternary salt, methacrylarnidopropyl trimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, diallyldimethylammonium chloride, and the like.

Representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl) dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N, N-diallylamine ammonium betaine (MDABS), N,N-diallyl-N-methyl-N-(2-sulfoethyl)ammonium betaine, and the like.

In certain embodiments, the polymer comprising amino groups, amide groups, or amino and amide groups is formed using at least one vinylic monomer. In certain embodiments, the vinylic monomer is an acrylic monomer. In certain embodiments, the polymer comprising amino groups, amide groups, or amino and amide groups comprises an acrylamide monomer or a methacrylamide monomer. In certain embodiments, the polymer comprising amino groups, amide groups, or amino and amide groups comprises an acrylamide monomer.

The polymer comprising an amino group, amide group, or amino and amide groups and the aldehyde-functionalized polymer can be a linear, branched, star, block, graft, or dedrimer polymer. Either polymer may be structurally-modified using a structural-modifier such as a cross-linking agent or a chain transfer agent.

Representative cross-linking agents include N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidyl acrylate, acrolein, glyoxal and vinyltrialkoxysilanes such as vinyltrimethoxysilane (VTMS), vinyltriethoxysilane, vinyltris(β-methoxyethoxy) silane, vinyltriacetoxysilane, allyltrimethoxysilane, allyltriacetoxysilane, vinylmethyldimethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinyltrimethoxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyoxysilane, vinyldimethoxyoleyloxysilane, and the like.

Representative chain transfer agents include alcohols such as methanol, ethanol, 1-propanol, 2-propanol, butyl alcohol, and glycerol, and the like, sulfur compounds such as alkylthiols, thioureas, sulfites, and disulfides, carboxylic acids such as formic and malic acid, and their salts and phosphites such as sodium hypophosphite, and combinations thereof. See Berger et al., "Transfer Constants to Monomer, Polymer, Catalyst, Solvent, and Additive in Free Radical Polymerization," Section II, pp. 81-151, in "Polymer Handbook," edited by J. Brandrup and E. H. Immergut, 3d edition, John Wiley & Sons, New York (1989) and George Odian, Principles of Polymerization, second edition, John Wiley & Sons, New York (1981).

In certain embodiments, the amino groups, amide groups, or combination of the amino and amide groups thereof are mono-reacted and di-reacted at a ratio of at least about 3 to 1 and the aldehyde-functionalized polymers have an average molecular weight of from about 10,000 g/mole to about 300,000 g/mole.

In certain embodiments, the amino groups, amide groups, or combination of the amino and amide groups thereof are mono-reacted and di-reacted at a ratio of at least about 3 to 1 and the aldehyde-functionalized polymers have an average molecular weight of from about 10,000 g/mole to about 100,000 g/mole.

In certain embodiments, the amino groups, amide groups, or combination of the amino and amide groups thereof are mono-reacted and di-reacted at a ratio of at least about 4 to 1 and the aldehyde-functionalized polymers have an average molecular weight of from about 10,000 g/mole to about 100,000 g/mole.

In certain embodiments, the aldehyde-functionalized polymer is an aldehyde-functionalized polyamide. In certain embodiments, the aldehyde-functionalized polyamide is an aldehyde-functionalized polymer comprising 100 mole percent of one or more nonionic monomers.

In certain embodiments, the aldehyde-functionalized polyamide is an aldehyde-functionalized copolymer comprising from about 1 to about 50 mole percent of one or more anionic monomers and from about 99 to about 50 mole percent of one or more nonionic monomers. In certain embodiments, the aldehyde-functionalized polyamide is an aldehyde-functionalized copolymer comprising about 1 to about 30 mole percent of one or more anionic monomers and about 99 to about 70 mole percent of one or more nonionic monomers.

In certain embodiments, the aldehyde-functionalized polyamide is an aldehyde-functionalized copolymer comprising from about 5 to about 99 mole percent of one or more acrylamide monomers and from about 95 mole percent to about 1 mole percent of one or more cationic, anionic or zwitterionic monomers, or a mixture thereof. In certain embodiments, the aldehyde-functionalized polyamide is an aldehyde-functionalized copolymer comprising from about 1 to about 99 mole percent of one or more acrylamide monomers and from about 99 mole percent to about 1 mole percent of one or more cationic, anionic or zwitterionic monomers, or a mixture thereof.

In certain embodiments, the aldehyde functionalized copolymer is an aldehyde-functionalized amphoteric polymer comprising up to about 40 mole percent of one or more cationic monomers and up to about 20 mole percent of one or more anionic monomers.

In certain embodiments, wherein the aldehyde functionalized copolymer is an aldehyde-functionalized amphoteric polymer comprising from about 5 to about 10 mole percent of one or more cationic monomers and from about 0.5 to about 4 mole percent of one or more anionic monomers.

In certain embodiments, the aldehyde-functionalized polyamide is an aldehyde-functionalized copolymer comprising from about 50 to about 99 mole percent of one or more acrylamide monomers and from about 50 to about 1 mole percent of one or more cationic monomers. In certain embodiments, the aldehyde-functionalized polymer is a copolymer comprising from about 50 to about 99 mole percent of one or more acrylamide monomers and from about 50 to about 1 mole percent of one or more cationic monomers wherein the copolymer is functionalized with glyoxal.

In certain embodiments, the aldehyde functionalized copolymer is an aldehyde-functionalized zwitterionic polymer comprising from about 1 to about 95 mole percent of one or more zwitterionic monomers. In certain embodiments, wherein the aldehyde functionalized copolymer is an aldehyde-functionalized zwitterionic polymer comprising from about 1 to about 50 mole percent of one or more zwitterionic monomers.

In certain embodiments, the aldehyde-functionalized polymer comprises DADMAC monomers. In certain embodiments, the aldehyde-functionalized polymer is a glyoxalated DADMAC/acrylamide polymer.

Figure 7:
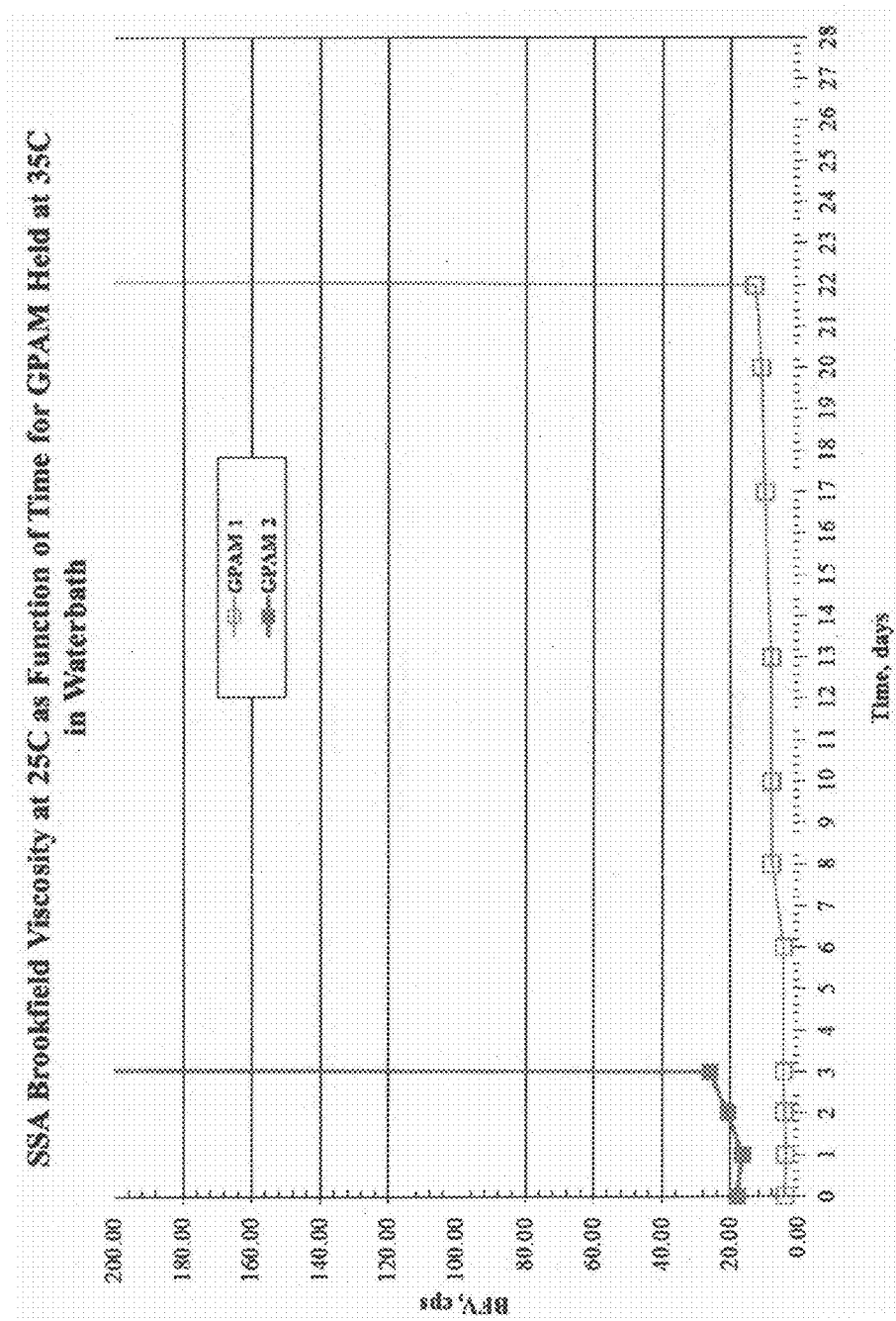
FIG. 7 is a line graph that illustrates the comparative shelf-life of the inventive low molecular weight acrylamide/DADMAC copolymer (GPAM 1) and a high molecular weight acrylamide/DADMAC copolymer (GPAM 2).

An advantage of the present invention is that the composition has increased shelf-life. For example, it was found that shelf-life increased when the viscosity of the aldehyde-functionalized polymer was less than 40 cps. The product shelf stability may depend on the storage temperature, product viscosity, total amount of reacted amide/amine, total concentration of polymer and aldehyde, the ratio of aldehyde to amide/amine functional groups, and pH. In certain embodiments, the pH of the product is maintained at a low pH (2 to 3.5) and the total concentration of polymer and aldehyde is optimized to extend shelf stability. As shown in FIG. 7, when the low weight polymers aldehyde-functionalized polymers (e.g., MW=68,000 g/mole) were compared to the corresponding high molecular weight aldehyde-functionalized polymers (e.g., MW=1,500,000 g/mole), the low weight polymers had much greater shelf-stability.

In another embodiment, the invention provides a method for enhancing the strength and press section dewatering of a paper sheet on a paper machine. The method comprises adding to the paper sheet about 0.05 lb/ton to about 20 lb/ton, based on dry fiber, of a composition comprising one or more aldehyde-functionalized polymers comprising amino groups, amide groups, or a combination of amino and amide groups thereof, wherein (i) at least about 15 mole percent of the amino groups, amide groups, or both the amino or amide groups are functionalized with one or more aldehydes, (ii) the amino groups, amide groups, or both the amino or amide groups are mono-reacted and di-reacted at a ratio of at least about 1.5 to 1, and (iii) the aldehyde-functionalized polymers have an average molecular weight of from about 10,000 g/mole to about 300,000 g/mole.

The amount of aldehyde-functionalized polymer added to the paper sheet is not limited. In certain embodiments, a composition comprising one or more aldehyde-functionalized polymers is added to the paper sheet in from about 0.05 lb/ton to about 20 lb/ton, based on dry fiber. Thus in certain embodiments, a composition comprising one or more aldehyde-functionalized polymers is added to the paper sheet in from about 0.05 lb/ton to about 20 lb/ton, from about 0.05 lb/ton to about 18 lb/ton, from about 0.05 lb/ton to about 15 lb/ton, from about 0.05 lb/ton to about 12 lb/ton, from about 0.05 lb/ton to about 10 lb/ton, from about 0.05 lb/ton to about 8 lb/ton, from about 0.05 lb/ton to about 6 lb/ton, from about 0.05 lb/ton to about 4 lb/ton, from about 0.05 lb/ton to about 3 lb/ton, from about 0.15 lb/ton to about 2 lb/ton, from about 1 lb/ton to about 20 lb/ton, from about 1 lb/ton to about 18 lb/ton, from about 1 lb/ton to about 15 lb/ton, from about 2 lb/ton to about 20 lb/ton, from about 2 lb/ton to about 18 lb/ton, from about 2 lb/ton to about 15 lb/ton, from about 5 lb/ton to about 15 lb/ton, from about 1 lb/ton to about 10 lb/ton, from about 1 lb/ton to about 5 lb/ton, or from about 5 lb/ton to about 10 lb/ton. In certain embodiments, a composition comprising one or more aldehyde-functionalized polymers is added to the paper sheet in from about 0.05 lb/ton to about 3 lb/ton.

The aldehyde-functionalized polymer can be added to the papermaking system in any form, but is commonly added as a solution comprising unreacted aldehyde. The solution comprising aldehyde-functionalized polymer can comprise unreacted aldehyde in any suitable amount. In certain embodiments, the solution comprising aldehyde-functionalized polymer comprises unreacted aldehyde in an amount from about 40% to about 95%, from about 40% to about 90%, from about 40% to about 85%, from about 40% to about 80%, from about 40% to about 75%, from about 40% to about 70%, from about 40% to about 65%, from about 40% to about 60%, from about 45% to about 95%, from about 50% to about 95%, from about 55% to about 95%, from about 60% to about 95%, from about 65% to about 95%, from about 70% to about 95%, from about 75% to about 95%, or from about 80% to about 95%. In certain embodiments, the solution comprising aldehyde-functionalized polymer comprises unreacted aldehyde in an amount from about 60% to about 95%.

In certain embodiments, the invention provides a paper sheet produced according to one of the aforementioned methods.

In certain embodiments, an aldehyde-functionalized polymer is added to a papermaking system as an aqueous solution. In certain embodiments, an aldehyde-functionalized polymer is added to a papermaking system as a solution in a co-solvent miscible with water. In certain embodiments, the aldehyde functionalized polymer is sprayed onto the paper sheet prior to press dewatering.

The composition and method of the present invention can be used in any papermaking process, including in a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. Conventional microparticles, alum, cationic starch or a combination thereof may be utilized as adjuncts with the polymer treatment of this invention, though it must be emphasized that no adjunct is required for effective dewatering activity.

The aldehyde functionalized polymers of the present invention can be added in traditional wet end locations used for conventional wet end additives. These include thin stock or thick stock. The actual wet end location is not considered to be critical. Because the aldehyde-functionalized polymers are believed to act as pressing aids, their addition to the wet end is not necessary, and the option of adding them just prior to the press section after the formation of the sheet can also be practiced. For example, the polymer can be sprayed (e.g., using a shower bar) on the wet web prior to entering the press section, and this may be a preferred mode of addition to reduce dosages or the effects of interferences which might occur in the wet end. Other traditional wet end additives can be used in combination with the aldehyde functionalized polymers. These include retention aids, strength additives such as starches, sizing agents, and the like.

When using aldehyde-functionalized polymers as described herein having net anionic charge, a method of fixing the polymer to the fiber may be needed. This fixing is typically accomplished by using cationic materials in conjunction with the polymers. Such cationic materials are most frequently coagulants, either inorganic (e.g. alum, polyaluminum chlorides, iron chloride or sulfate, and any other cationic hydrolyzing salt) or organic (e.g. p-DADMACs, EPI/DMAs, PEIs, modified PEIs or any other high charged density low to medium molecular weight polymers). Additionally, cationic materials added for other purposes like starch, wet strength, or retention additives can also serve to fix the anionic polymer. No additional additives are generally needed to fix cationic aldehyde-functionalized polymers to the filler.

The aldehyde-functionalized polymers are useful for dewatering all grades of paper and paperboard. In certain embodiments, the aldehyde-functionalized polymers are used to prepare recycle board grades using OCC (old corrugated containers), with or without mixed waste. In certain other embodiments, the aldehyde-functionalized polymers are used to prepare virgin, recycled, mechanical, chemical, bleached, or unbleached paper.

In certain embodiments, a composition comprising aldehyde-functionalized polymer further comprises a cationic starch.

The following examples further illustrate the invention but, of course, should not be construed as in any way limiting its scope.

EXAMPLE 1

This example illustrates the glyoxalation reaction of an acrylamide/DADMAC copolymer with glyoxal to form GPAM 1.

Synthesis of GPAM 1. To a 2,000-mL reaction flask fitted with a mechanical stirrer, thermocouple, condenser, addition port and sampling valve at the bottom of the reactor was added 307.62 g of a 41% aqueous solution of 95/5 mole % acrylamide/DADMAC copolymer and 1470.42 g of deionized or soft water. The polymer solution was stirred at 400 rpm. The pH of the solution was adjusted to 8.8 to 9.1 by adding 6.6 g of 50% aqueous sodium hydroxide solution. The reaction temperature was set at 24 to 26° C. Glyoxal (184.72 g of a 40% aqueous solution) was added to the reaction mixture over 20 to 30 minutes. The Brookfield viscosity (Brookfield Programmable LVDV-II+ Viscometer, LV #1 spindle at 60 rpm, Brookfield Engineering Laboratories, Inc, Middleboro, Mass.) of the reaction mixture was about 4 to 5 cps after glyoxal addition. The pH of the reaction mixture was adjusted to 7.5 to 8.8 using 10% aqueous sodium hydroxide (23 g) added over 20 to 30 minutes. The Brookfield viscosity of the reaction mixture was about 4 to 5 cps after sodium hydroxide addition. The pH of the reaction mixture was maintained at about 7 to 9 at about 24 to 26° C. with good mixing.

The Brookfield viscosity was monitored and upon achieving the desired viscosity increase of greater than or equal to 1 cps (5 cps or greater) the pH of the reaction mixture was decreased to 2 to 3.5 by adding sulfuric acid (93%) to substantially decrease the reaction rate. The product was a clear to hazy, colorless to amber, fluid with a Brookfield viscosity greater than or equal to 5 cps. $C^{13}$ NMR analysis of the samples prepared indicated that about 75-85% of the glyoxal was unreacted and 15 to 30 mole percent of the acrylamide units reacted with glyoxal. This glyoxalation resulted in the formation of GPAM 1, which had a glyoxal to acrylamide mole ratio of 0.8 to 1 and 10% total actives (total glyoxal and polymer).

EXAMPLE 2

This example provides characterization data for a glyoxalated polyamide in accordance with the present invention (GPAM 1) and glyoxalated polyamides of greater molecular weight (GPAMs 2-4). GPAM 2 is the corresponding glyoxalated polyamide of GPAM 1, but having greater molecular weight. Both GPAMs 1 and 2 were prepared by Applicants. GPAMs 3 and 4 were commercially procured.

TABLE 1

| sample | unreacted glyoxal, % | mono glyoxal, % | di glyoxal, % | unreacted amide, % | mono amide, % | di amide, % | BFV, cps | Mw, kD |
|---|---|---|---|---|---|---|---|---|
| GPAM 1 | 80 | 18 | 2 | 83 | 14 | 3 | 6.3 | 68 |
| GPAM 2 | 72 | 23 | 6 | 74 | 17 | 8 | 18.6 | 1500 |
| GPAM 3 | 77 | 20 | 3 | 80 | 15 | 5 | — | 300-1000 |
| GPAM 4 | 67 | 25 | 7 | 84 | 10 | 6 | — | — |

EXAMPLE 3

This example illustrates the STFI strength of paper produced in a laboratory using an aldehyde-functionalized polymer in accordance with an embodiment of the invention.

The STFI strength of paper produced using GPAM 1 and GPAM 2 of Example 2 was determined in accordance with TAPPI Method T826. FIG. 1 illustrates the STFI ratio of the paper per dosage of an inventive low molecular weight acrylamide/DADMAC copolymer (GPAM 1) and a high molecular weight acrylamide/DADMAC copolymer (GPAM 2) in a laboratory experiment.

The graph demonstrates that the STFI strength of lab-made paper with GPAM 1 is slightly lower than the STFI strength of lab-made paper with GPAM 2.

EXAMPLE 4

This example illustrates the dewatering properties of paper produced using an aldehyde-functionalized polymer in accordance with an embodiment of the invention.

Figure 2:
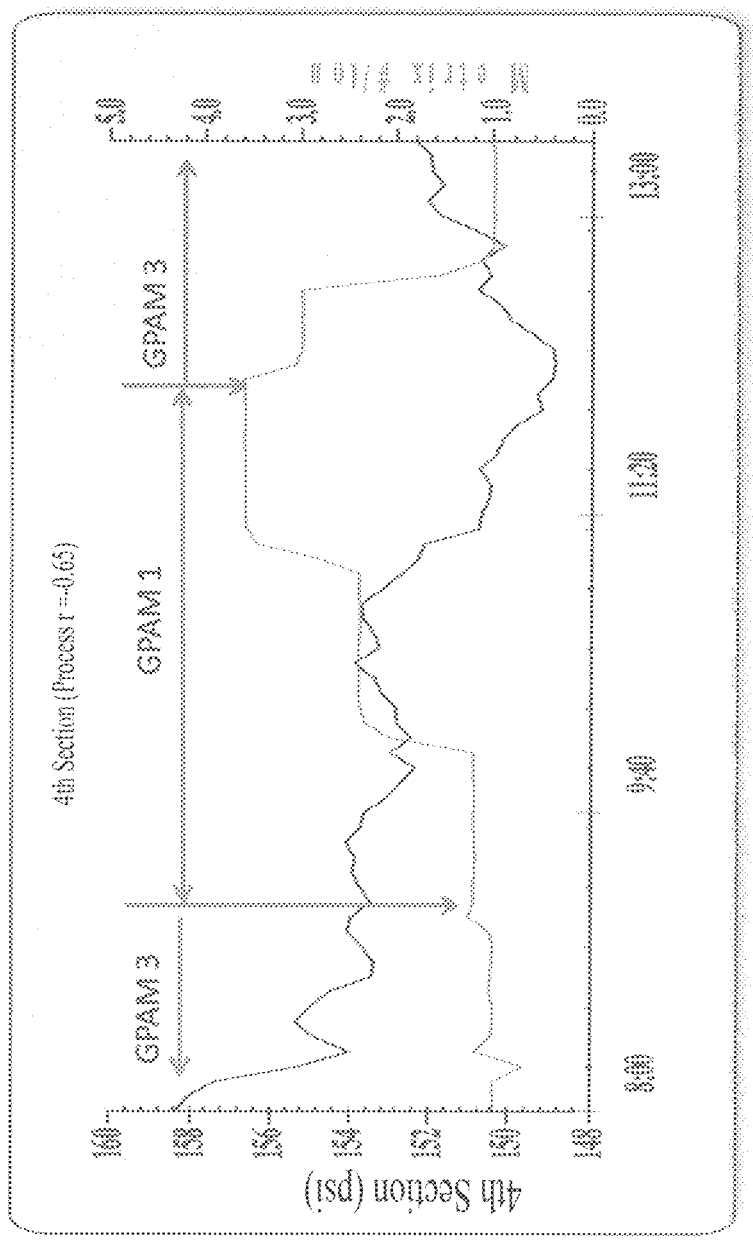
FIG. 2 is a line graph that illustrates steam demand of paper using an inventive low molecular weight acrylamide/DADMAC copolymer (GPAM 1) and a high molecular weight acrylamide/DADMAC copolymer (GPAM 3) in an initial mill trial.

The dewatering effects of glyoxalated DADMAC/acrylamide polymers GPAM 1 and 3 were evaluated through paper machine trials as shown in FIG. 2. The relative performance of GPAM 1 was compared to GPAM 3. The trials are run on a dual headbox Fourdrinier papermachine using 100% OCC furnish manufacturing recycle linerboard and corrugating medium. Actual papermachine conditions varied depending on the specific grade of paperboard being made. In all cases, a retention program of polyaluminum chloride fed to the thick stock and a cationic flocculant fed to the thin stock is used. For linerboard grades, ASA sizing fed to the thin stock is also present. The glyoxalated acrylamide polymers are applied through a spray boom to the underside of the top ply prior to meshing with the bottom ply, although earlier trials demonstrated the dewatering effect could also be achieved by wet-end thick or thin stock addition.

The dewatering effect of the polymers is evaluated on the basis of steam pressure changes in the machine dryer section which are provided through the mills DCS (distributive control system) computer system. The sheet moisture at the reel is measured on-line and is maintained by adjustment of the steam pressure (a measure of steam usage or energy consumption). Lower sheet moisture at the reel reflects a lower sheet moisture going into the dryer section or equivalently, better dewatering through the machine sections preceding the dryer section. The lower steam demand, as measured by pressure, then reflects improved dewatering. If the steam pressure in these sections drops to a level where the operator feels comfortable that nonnal swings in steam demand can be handled, then he will increase the machine speed manually. When changes in polymer type or dose are made, the steam pressure from one of the steam sections is followed closely to see if any change occurs, with proper consideration given to changes in production rates when they occur.

FIG. 2 demonstrates that paper produced using an aldehyde-functionalized polymer of an embodiment of the present invention (e.g., GPAM 1) increases dewatering during the papermaking process.

EXAMPLE 5

This example illustrates the amount of water removed from the press felt for a process using an aldehyde-functionalized polymer in accordance with an embodiment of the invention.

GPAM 1 and GPAM 3 of Example 2 were introduced to a slurry of a papermaking process to evaluate impact on Weir Flow. The papermaking process was as described in Example 4. During the trial, GPAM 3 was substituted with GPAM 1. The Weir Flow of the resulting paper was measured to determine the amount of water being removed from the press felt.

Figure 3:
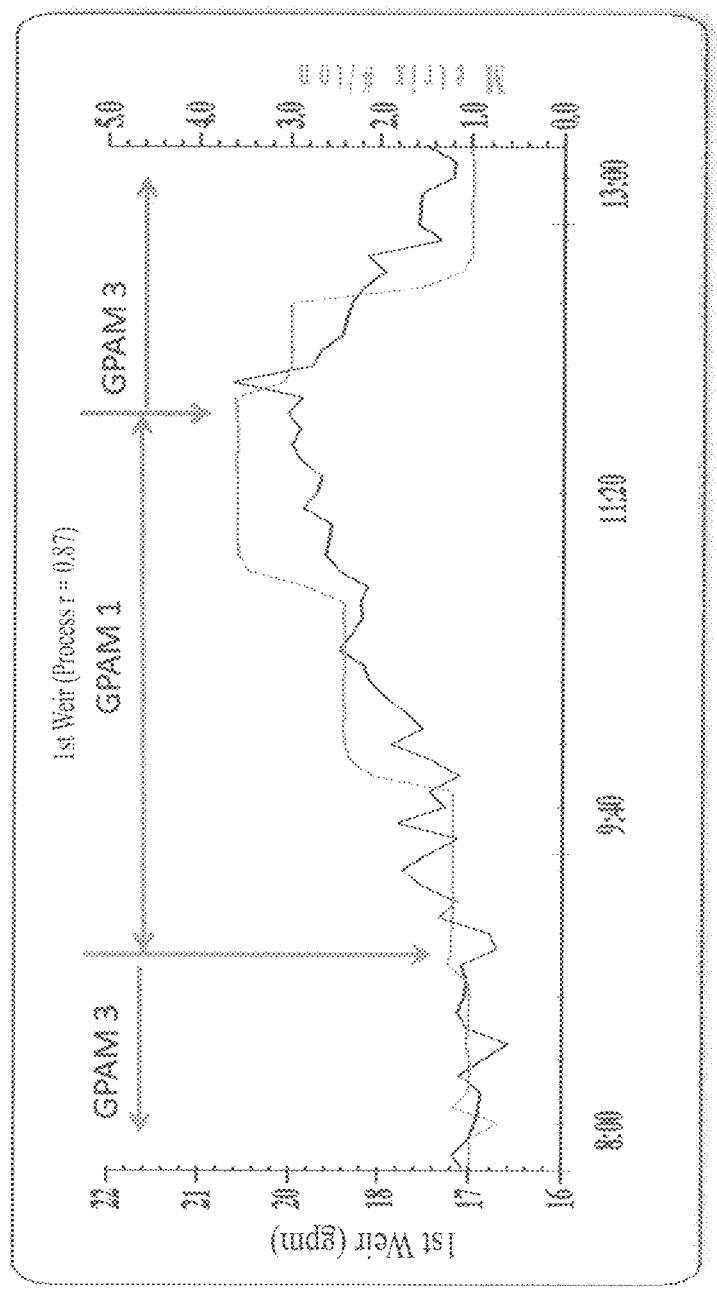
FIG. 3 is a line graph that illustrates the Weir flow of paper using an inventive low molecular weight acrylamide/DADMAC copolymer (GPAM 1) and a high molecular weight acrylamide/DADMAC copolymer (GPAM 3) in an initial mill trial.

FIG. 3 illustrates the Weir Flow of paper made using GPAM 1 and GPAM 3. The graph demonstrates that the amount of water removed from the press felt increased when the additive was switched from GPAM 3 to GPAM 1.

EXAMPLE 6

This example illustrates the dry strength of paper produced using an aldehyde-functionalized polymer in accordance with an embodiment of the invention.

GPAM 1 and GPAM 3 of Example 2 were introduced to a slurry of a papermaking process to evaluate impact on dry strength. The papermaking process was as described in Example 4. During the trial, GPAM 3 was substituted with GPAM 1. The resulting dry strength was measured using a Concora Crush test according to TAPPI T824 protocols (measuring the edgewise compression performance of fluted medium that determines the contribution of the medium to the compression strength of the completed container).

Figure 4:
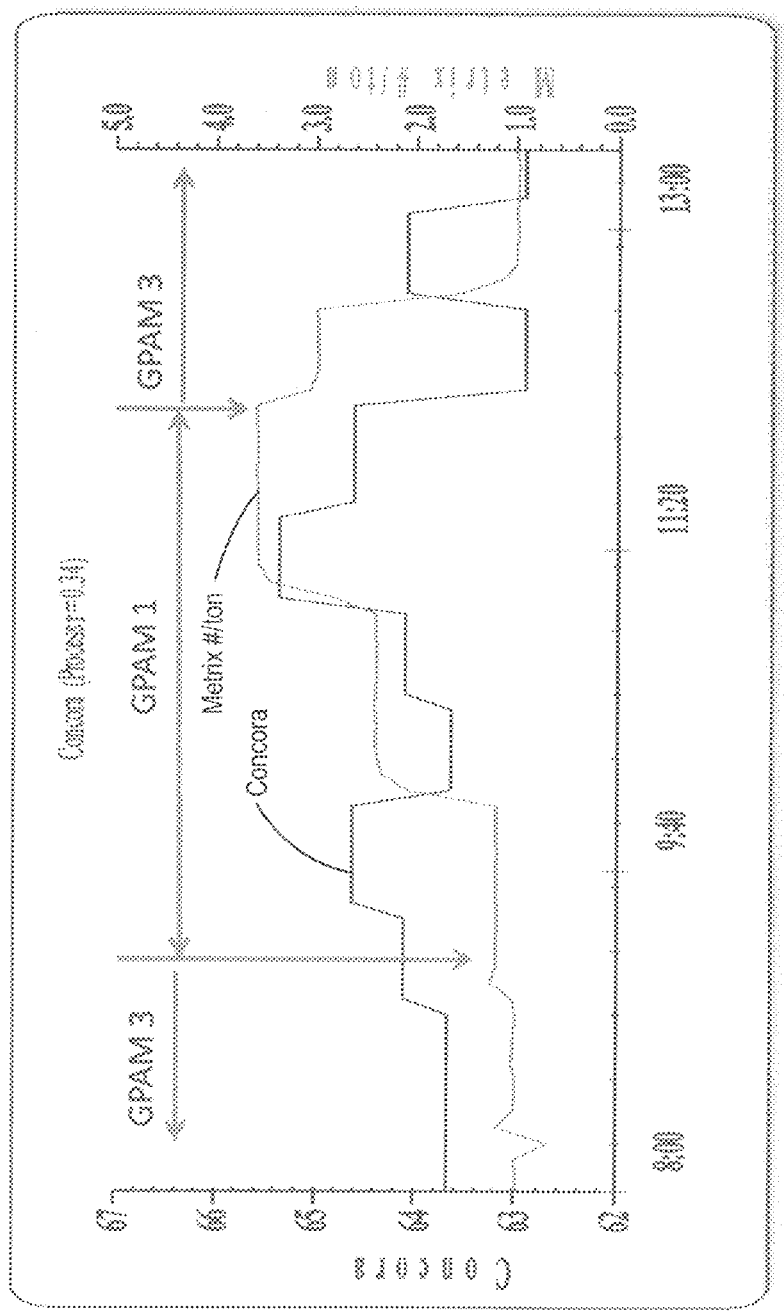
FIG. 4 is a line graph that illustrates Concora strength of paper using an inventive low molecular weight acrylamide/DADMAC copolymer (GPAM 1) and a high molecular weight acrylamide/DADMAC copolymer (GPAM 3) in an initial mill trial.

FIG. 4 illustrates the dry strength of paper made in a paper machine trial using GPAM 1 and GPAM 3. The graph demonstrates that the dry strength of paper increased when the additive was switched from GPAM 3 to GPAM 1. This result was unexpected because it was observed that paper prepared in a laboratory using GPAM 1 had lower strength than paper prepared in a laboratory using a polymer having a higher molecular weight (e.g., GPAM 2 vs. GPAM 1 in Example 3).

EXAMPLE 7

This example illustrates the steam demand of paper produced using an aldehyde-functionalized polymer in accordance with an embodiment of the invention.

The dewatering effect of glyoxalated DADMAC/acrylamide polymers GPAM 1 and GPAM 3 was evaluated through paper machine trials. During the trial, GPAM 3 was substituted with GPAM 1. The trial was carried out as described in Example 4. The relative performance of GPAM 1 was compared to GPAM 3.

Figure 5:
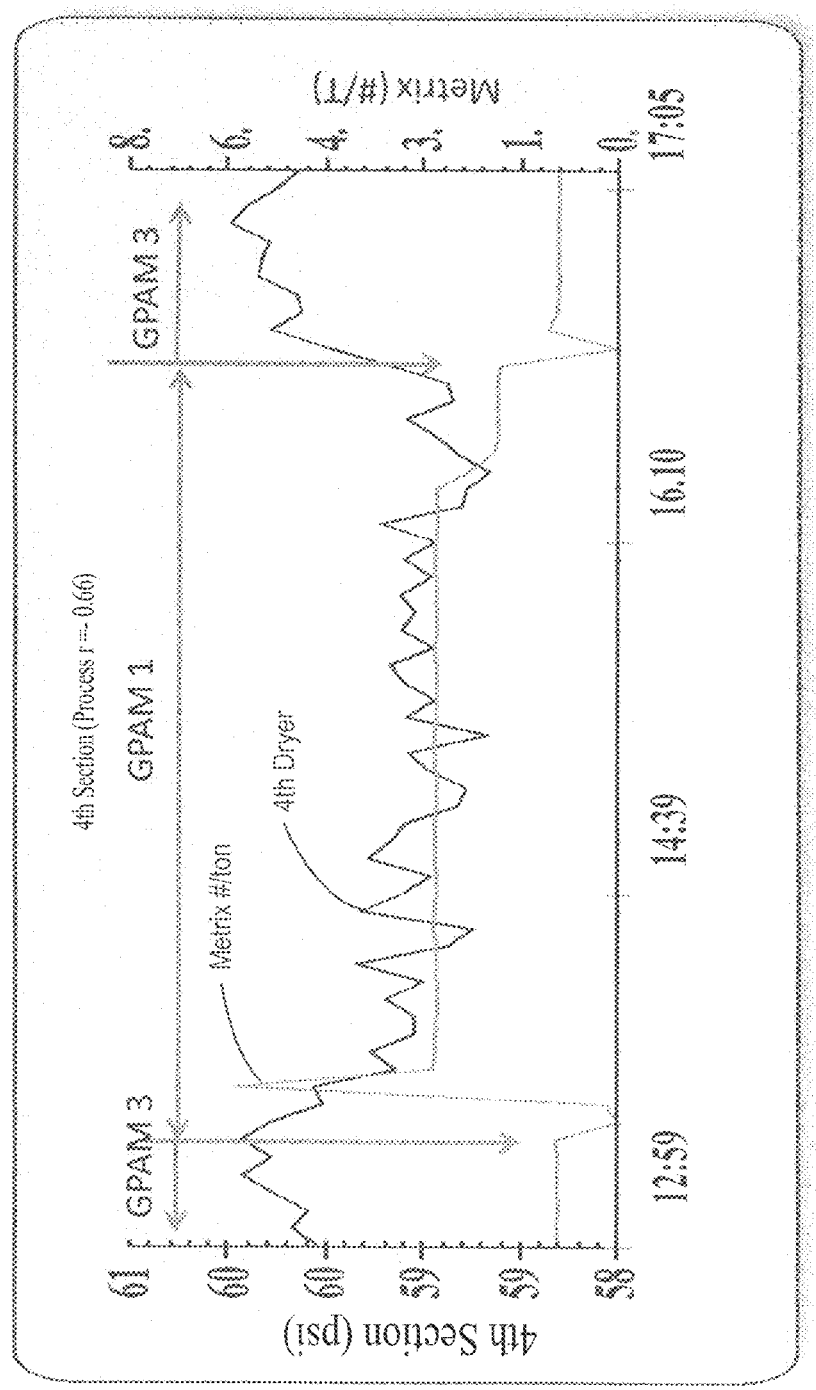
FIG. 5 is a line graph that illustrates steam demand of paper using an inventive low molecular weight acrylamide/DADMAC copolymer (GPAM 1) and a high molecular weight acrylamide/DADMAC copolymer (GPAM 3) in a second mill trial.

FIG. 5 demonstrates that paper produced using an aldehyde-functionalized polymer of an embodiment of the present invention (e.g., GPAM 1) increased dewatering during the papermaking process.

EXAMPLE 8

This example illustrates the STFI strength of paper produced using an aldehyde-functionalized polymer in accordance with an embodiment of the invention.

Figure 6:
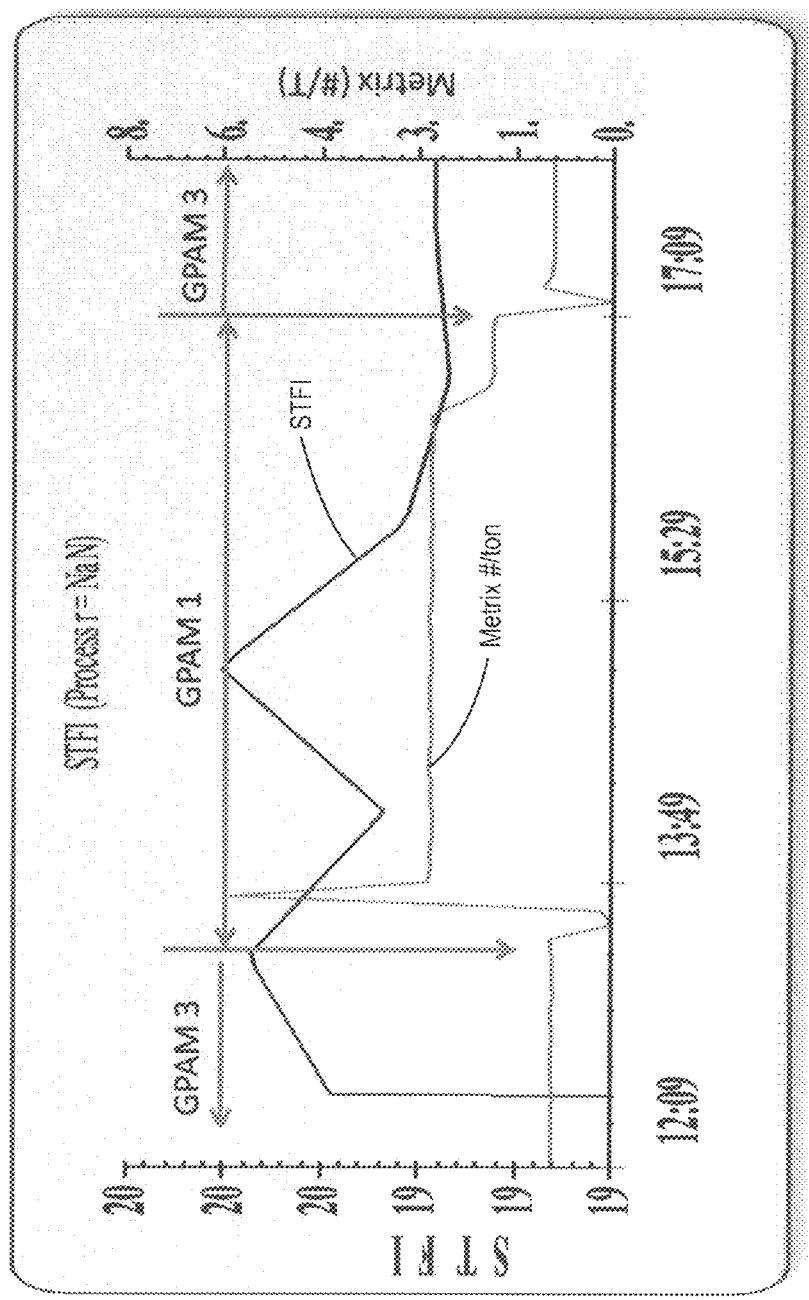
FIG. 6 is a line graph that illustrates STFI strength of paper using an inventive low molecular weight acrylamide/DADMAC copolymer (GPAM 1) and a high molecular weight acrylamide/DADMAC copolymer (GPAM 3) in a second mill trial.

The test was conducted as described in Example 4. During the trial, GPAM 3 was substituted with GPAM 1. The STFI strength of paper produced using GPAM 1 and GPAM 3 was determined in accordance with TAPPI Method T826. FIG. 6 illustrates that the STFI of paper made in a paper machine trial using an inventive low molecular weight acrylamide/DADMAC copolymer (GPAM 1) is similar or greater than the STFI of paper made using a high molecular weight acrylamide/DADMAC copolymer (GPAM 3). The graph demonstrates that even though GPAM 1 has a much lower molecular weight, the STFI strength of paper made with GPAM 1 is similar or greater than the STFI strength of paper made with GPAM 3. This result was unexpected because it was observed that paper prepared in a laboratory using GPAM 1 had lower strength than paper prepared in a laboratory using a polymer having a higher molecular weight (e.g., GPAM 2 vs. GPAM 1 in Example 3).

EXAMPLE 9

This example illustrates the stability of an aldehyde-functionalized polymer in accordance with an embodiment of the invention.

FIG. 7 provides an illustration of a stability test curve (i.e., Brookfield Viscosity vs. Days) for GPAM 1 and GPAM 2 held in a waterbath at 35° C. The graph demonstrates that GPAM 1 had greater stability than GPAM 2.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of enhancing the strength and press section dewatering of a paper sheet on a paper machine comprising adding to the paper sheet about 0.05 lb/ton to about 20 lb/ton, based on dry fiber, of an aqueous composition comprising one or more aldehyde-functionalized polymers comprising amino groups, amide groups, or a combination of amino and amide groups thereof, wherein (i) from about 15 to about 20 mole percent of the amino groups, amide groups, or both the amino or amide groups are functionalized with one or more aldehydes, (ii) the amino groups, amide groups, or both the amino or amide groups are mono-reacted and di-reacted at a ratio of from about 4:1 to about 20:1, and (iii) the aldehyde-functionalized polymers have an average molecular weight of from about 10,000 g/mole to 100,000 g/mole.

2. The method of claim 1, wherein at least about 10 mole percent of the amino groups, amide groups, or the combination of the amino and amide groups are mono-reacted.

3. The method of claim 1, wherein the aldehyde is selected from formaldehyde, paraformaldehyde, glyoxal, glutaraldehyde, or a combination thereof.

4. The method of claim 1, wherein the aldehyde-functionalized polymer is an aldehyde-functionalized polyamide.

5. The method of claim 1, wherein the aldehyde-functionalized polymer comprises at least one monomer selected from acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-tert-butylacrylamide, N-methylolacrylamide, allylamine, and diallylamine.

6. The method of claim 1, wherein the paper sheet comprises recycled board.

7. The method of claim 6, wherein the recycled board comprises old corrugated containers.

8. The method of claim 1, wherein the paper sheet is produced from furnish consisting essentially of old corrugated containers.

9. The method of claim 1, wherein the amino groups, amide groups, or both the amino or amide groups are mono-reacted and di-reacted at a ratio of from about 5:1 to about 20:1.

10. The method of claim 1, wherein the amino groups, amide groups, or both the amino or amide groups are mono-reacted and di-reacted at a ratio of from about 6:1 to about 20:1.

11. The method of claim 1, wherein the amino groups, amide groups, or both the amino or amide groups are mono-reacted and di-reacted at a ratio of from about 7:1 to about 20:1.

12. The method of claim 1, wherein the amino groups, amide groups, or both the amino or amide groups are mono-reacted and di-reacted at a ratio of from about 8:1 to about 20:1.

13. The method of claim 1, wherein the amino groups, amide groups, or both the amino or amide groups are mono-reacted and di-reacted at a ratio of about 9:1.

14. The method of claim 1, wherein the aldehyde-functionalized polymers have an average molecular weight of from about 50,000 g/mole to about 90,000 g/mole.

15. The method of claim 1, wherein the aldehyde-functionalized polymers have an average molecular weight of about 68,000 g/mole.

16. The method of claim 1, wherein the aqueous composition is added to the to the paper sheet via treatment of thin stock or thick stock.

17. The method of claim 1, wherein the aqueous composition is sprayed onto the paper sheet prior to press dewatering.

18. The method of claim 17, wherein the paper sheet is a multiply linerboard and corrugated medium having a top ply and a bottom ply that are meshed.

19. The method of claim 18, wherein the aqueous composition is sprayed to an underside of the top ply prior to meshing with the bottom ply.

20. A paper sheet produced according to the method of claim 1.

* * * * *

UNITED STATES PATENT AND TRADEMARK OFFICE
CERTIFICATE OF CORRECTION

PATENT NO. : 10,006,170 B2
APPLICATION NO. : 15/229681
DATED : June 26, 2018
INVENTOR(S) : Herman Mark Grimm et al.

It is certified that error appears in the above-identified patent and that said Letters Patent is hereby corrected as shown below:

On the Title Page

In the Patent Term Adjustment (*) Notice, Line 3, please delete "by 0 days. days." and add --by 0 days.--

In the Claims

Column 20 in Claim 16, Line 2, please delete "to the to the paper" and add --to the paper--

Signed and Sealed this
Fourth Day of September, 2018

Andrei Iancu
*Director of the United States Patent and Trademark Office*